Patented Mar. 13, 1934

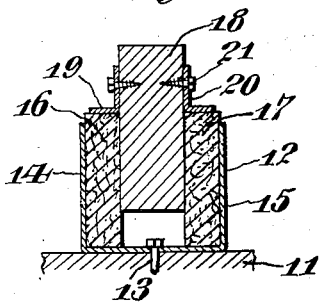
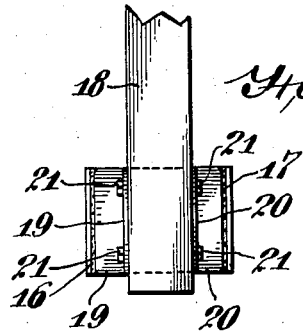
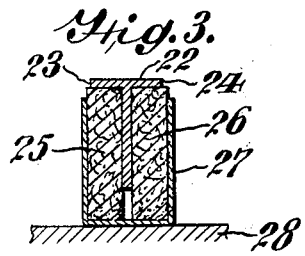
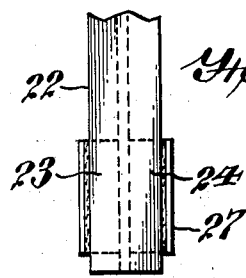
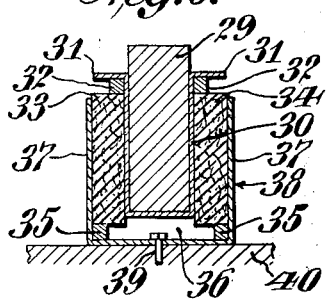
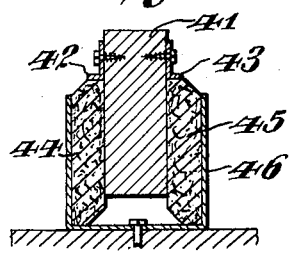
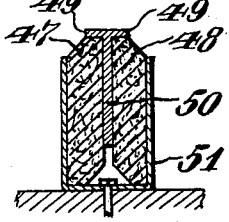
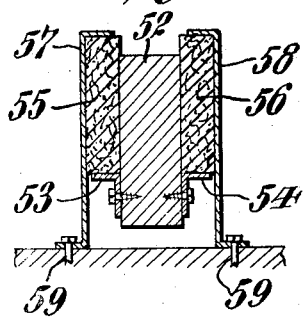
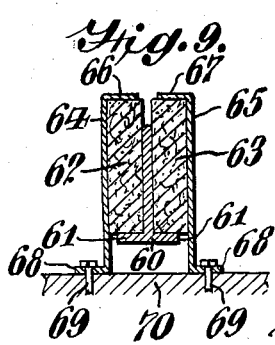

1,951,217

UNITED STATES PATENT OFFICE

1,951,217

VIBRATION DAMPENER AND ISOLATOR

Stephen E. Slocum, Ardmore, Pa.

Application January 10, 1931, Serial No. 507,851

9 Claims. (Cl. 20—4)

This invention is an improvement over and a continuation in part of the method and means disclosed in my copending application Serial No. 496,611, filed Nov. 19th, 1930 for a Vibration dampener and isolator and in general relates to means for dampening and isolating vibrations in oscillating bodies, machines, building and structures, having for its principal object the provisions of improved means of the kind described that will prevent or eliminate in large measure the transmission of vibrations from an oscillating body, such as a machine in operation to adjacent bodies or structures.

Another object of the invention is to provide a vibration dampener or isolator of a novel type wherein the results achieved are accomplished by supporting or connecting the machine or load to the foundation by means of vibration absorbing material.

A further object of the invention is to provide vibration damping means of a comparatively simple and inexpensive construction, but of the highest efficiency in absorbing vibrations.

A still further object of the invention is to support a machine or a mechanically oscillating body to a base so that the principal strain developed may be shear.

Other objects and advantages of the invention will appear hereinafter when taken in connection with the accompanying drawing in which:—

Figure 1 is a vertical sectional view of an embodiment of my invention, showing a form of vibration-damping support for a beam or joist;

Figure 2 is a top plan view of the device shown in Figure 1;

Figure 3 is a vertical sectional view of an embodiment of the invention showing a form of vibration-damping support for a flanged metal beam;

Figure 4 is a top plan view of the device shown in Figure 3;

Figure 5 is a vertical sectional view of a modified form of the invention in which the principal strain developed in the vibration-damping material is shear;

Figure 6 is a modified form of the invention shown in Figs. 1 and 2 obtained by altering the relative position of the points of loading and points of support of the vibration-damping material in such a manner that the principal strain developed in this medium is vertical shear;

Figure 7 is a modification of the invention shown in Figure 3 formed by altering the relative position of the points of loading and the points of support of the vibration-damping medium in such manner that the principal strain produced in this medium shall be vertical shear;

Figure 8 is a vertical sectional view of an embodiment of my invention in the form of a vibration-damping anchorage for a beam or joist which is substantially the same in function and relative arrangement of its parts as an inverted form of Figure 1, and Figure 9 is another embodiment of the invention in the form of a vibration-damping anchorage for a flanged metal beam which is substantially the same in function and relative arrangement of parts as an inverted form of Figure 3.

Before entering into a detailed description of the parts entering into the preferred form of the invention, it is desired to point out that at the present time the checking or elimination of vibrations and noise is being given careful attention in engineering fields, numerous antivibration and noise eliminating devices having been placed on the market with a view to accomplishing this result.

Heretofore machines having vibrating parts have been supported on floors, foundations, etc. by placing the upright or supporting elements of the machine in chairs or sockets lined with felt or similar vibration-damping means. These devices have substantially lessened vibration, but I have found when vibration-creating bodies or machines are supported in shear on a foundation, the tendency of the entire mechanical system including the oscillating body to vibrate can be decreased to an extent not hitherto possible by the methods and means employed.

I have described in the Proceedings of the American Society of Civil Engineers for the year 1929, pages 2109-2129 inclusive, various tests and experiments conducted by me with a view of determining the most effective means for eliminating vibration and consequently noises. As a result of these tests and experiments it was discovered that supporting a vibrating body such as a machine in operation in such a manner that the principal strain in the supporting material would be shear, was the most efficient method available, or in other words supporting a mechanically vibrating body by means including dampening material so loaded that the principal strain in this material shall be shear in conformity with Hooke's law, the said material accordingly having preferably an appreciable value of the modulus of elasticity in shear.

Among the features that should enter into a vibration damping or isolating device or system of the highest efficiency, the following pre-requisites may be assumed as a consequence of the tests made by me.

1. The principal strain in the vibration-absorbing medium should be shear;

2. With a view to convenience in manufacture and practical application, the vibration-absorbing medium should be produced in units of convenient size with a view to a quick determination of unit load and deformation;

3. Anchorage of the machine should be obtained without impairing or interfering with the vibration-absorbing properties of the damping means;

4. The vibration-absorbing or isolation units should preferably be as compact as possible with a view to occupying as little space for installation as possible.

5. The vibration-absorbing units should be designed with a view to their ready manufacture in stock sizes for the convenience of the building trades and machine manufacturers, each size having certain definite range of unit load and unit deformation.

6. The vibration absorbing units should be so designed and constructed in various sizes that their natural frequency of vibration may be definitely constant and readily predetermined by tests, so as to avoid the possibility of synchronism with the impressed frequency of the body or machine they support.

In accordance with the present invention, I have provided laminations or sections of vibration-damping material on which the load is supported in shear, this being one of the principal features of the present invention, although the principle of load suspension in flexure may also be introduced to a variable extent. Heretofore as pointed out above, the general method employed for load suspension of machinery has been compression in conjunction with suitable vibration damping material. In this latter conventional method, it has been determined by tests, that oscillations from the machine or device supported are communicated with much greater facility to the foundation or supporting medium than when, as in my device, the load is supported in shear.

By a general inspection of the figures, it will be at once apparent that the load is not placed or carried directly over the rigid supports but between them, thereby developing a strain or resistance of pure vertical shear in the vibration-absorbing medium. It will be further noted that by altering or widening the span of the vibration-absorbing material, or in other words, separating to a greater extent the points of support of the shock absorbing medium on the foundation, a component of flexure may be introduced to any desired extent as supplementary to the shearing component.

For the purpose of illustrating my invention, I have shown in the accompanying drawing several improved forms thereof which are at present preferred by me, since the same has been found in practice to give satisfactory and reliable results, although it is to be understood that the various instrumentalities of which my invention consists can be variously arranged and organized, and that my invention is not limited to the precise arrangement and organization of the instrumentalities as herein shown and described.

In the drawing wherein similar characters of reference indicate corresponding parts in the several views of the preferred form of the invention, 11 designates any suitable foundation material such as concrete cement, to which my dampener or isolator is secured. My present vibration dampener comprises a U-shaped strap or stirrup 12 which may be suitably secured as by the bolt 13 to the concrete 11. Arranged in and against the inner lateral surface of the upstanding arms 14—15 of the U-shaped member or stirrup 12 are a plurality of laminations or sections 16, 17 of vibration-damping material which may be hair felt, glass polishing felt, factice, rubber or other suitable vibration damping substance. A beam 18 is arranged between the strips of vibration-damping material 16, 17 and supported thereon by angle iron lugs or brackets 19, 20 which are secured to the beam 18 in any suitable manner, as by the screws 21, the brackets 19, 20 being positioned on the upper ends of the vibration damping material 16, 17 and serving to transmit the load on the beam to the sections of vibration-damping material.

In Figures 3 and 4 the assembly of beam and metal lugs or brackets, shown in Figures 1 and 2, is replaced by a metal beam 22 having flanges 23, 24. The load on the beam 22 is transmitted through the horizontal flanges 23, 24 to the sections of vibration-damping means 25, 26 arranged in the channel iron or stirrup 27 which may rest on a suitable foundation 28.

In Figure 5 the beam 29 is received in a channel iron or stirrup 30 having lateral projections or flanges 31 which lie on blocks or sections of material 32 directly resting on the upper ends of laminations or sections 33, 34 of vibration-absorbing or damping material, the lower ends of which lie on other blocks or sections 35 of material arranged on either side of the opening 36 between the arms 37 of a stirrup or channel iron 38 suitably anchored as by a bolt 39 to a base 40.

The embodiment disclosed in Figure 6 shows a further modification of the invention in the form shown in Figure 1. It will be observed that in Figure 6 the beam 41, on which the load may rest, is supported by the angle brackets 42, 43 not directly over the points of support at which the vibration-damping medium 44, 45 rests on the housing or stirrup 46, but inside of or between these points in such a manner that the principal strain produced in the said medium 44, 45 is vertical shear.

In Figure 7 a modification of the arrangement shown in Figure 3 is disclosed. The points at which the load is here applied to the damping means 47, 48 by the flanges 49 of the beam 50 lie inside of, or between the points of support of the damping means 47, 48 on the housing or channel iron 51, thereby causing the principal strain in the damping medium 47, 48 to be vertical shear.

Figure 8 shows a vibration-damping anchorage for a beam or joist 52 which, as regards its effect in preventing vertical upward motion of the beam 52, is substantially the same as an inverted form of Figure 1. The beam 52 is provided with angle iron brackets 53, 54, attached on opposite sides thereof in such a manner that a vertical upward load applied to the beam 52 is transmitted through these angle iron brackets 53, 54, to laminations or sections of vibration-damping material 55, 56, through which it is transmitted to flanged anchorage straps 57, 58 attached to the floor or foundation in any suitable manner, as by the bolts 59.

Figure 9 shows a modified form of the vibration-damping anchorage shown in Figure 8, this modification consisting in substituting for the assembly of beam and angle iron brackets a metal beam 60 having flanges 61. The metal beam 60 as clearly shown in Figure 9 is arranged between sections of vibration or absorbing material 62, 63, through which latter the load is transmitted to anchorage straps 64, 65 having at their upper ends flanges 66, 67, respectively which serve to confine the vibration-damping material 62, 63 in the position shown. The lower ends of the anchorage straps 64, 65 are provided with lugs or extensions 68 through which bolts 69 are passed, the latter being engaged with the foundation material 70.

It is to be observed that the anchorages shown in Figures 8 and 9 may be modified in a manner similar to that shown in Figures 5, 6 and 7 by disposing or arranging the location of the points of loading relatively to that of the points of support so that the principal strain developed in the shock absorbing or vibration-damping medium shall be shear.

It may be pointed out that in the forms of the invention shown in Figures 5, 6 and 7, the principal strain developed in the vibration-absorbing material is shear. In Figures 1 to 4 inclusive, the strain developed in the vibration-damping material is largely compression, and the same is true of the modified forms of the invention shown in Figures 8 and 9.

It is desired to point out that in eliminating vibration and noises arising therefrom, not only is the life of the building conserved, but the material comfort of all in the said building is greatly enhanced.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. A vibration-dampening or insulating support for a beam consisting of a unitary assemblage comprising means for supporting a load-carrying beam on two separate laminations of resilient material, equally and jointly, said laminations being confined between an inner U-shaped rigid stirrup engaging the beam and an outer U-shaped rigid stirrup engaging the foundation in such manner that the vertical dimension of these laminations parallel to the axis of the load may be made much greater than the transverse dimension or width.

2. A vibration-dampening or insulating support for a beam consisting of a unitary assemblage comprising means for supporting a load-carrying beam on two separate laminations of resilient material, equally and jointly, said laminations being confined between an inner U-shaped rigid stirrup engaging the beam and an outer U-shaped rigid stirrup engaging the foundation in such manner that the vertical dimension of these laminations parallel to the axis of the load may be made much greater than the transverse dimension or width, and so disposed with reference to the points of support that the line of application of the load carried on these laminations is displaced laterally with respect to the line of application of the reaction of the foundation.

3. A vibration-dampening or insulating support for a beam consisting of a unitary assemblage comprising two separate laminations of resilient material interposed between the vertical risers of an outer U-shaped metal stirrup engaging the foundation and an inner U-shaped metal stirrup engaging the beam and horizontal flanges thereon, the resilient laminations being so disposed as to fit snugly between these stirrups but without physical bond to the retaining surfaces with which they contact.

4. A vibration-dampening support for a load-carrying beam comprising a unitary assemblage for confining laminations of resilient material between rigid elements engaging the beam and a foundation respectively, said rigid elements consisting of an inner U-shaped flanged stirrup engaging the beam, and an outer rigid element consisting of a U-shaped socket engaging the foundation, these rigid elements being disposed in such manner that the depth of the resilient laminations confined therebetween may be made much greater than their width normal to the axis of the beam, thereby securing any desired depth of resilient lamination and conjointly limiting the area of horizontal bearing surface of same to any prescribed amount.

5. A vibration-dampening support for a load-carrying beam comprising a unitary assemblage for confining laminations of resilient material between the web and flanges of a structural metal beam and a rigid socket engaging a foundation, the web and flanges of the beam being so disposed with relation to the rigid socket that the depth of the resilient laminations inclosed may be made much greater than their width normal to the axis of the beam, thereby securing any desired depth of resilient lamination, and conjointly limiting the area of horizontal bearing surface of same to any prescribed amount.

6. A vibration-dampening anchorage for restraining upward motion of a beam, consisting of a unitary assemblage comprising means for transferring the upward reaction to the anchorage through two separate laminations of resilient material, said laminations being confined between an inner rigid member having the form of a U-shaped stirrup engaging the beam, and an outer rigid member having the form of an inverted U-shaped socket engaging a foundation, said socket being provided with flanges engaging the resilient laminations in such manner as to restrain their upward motion.

7. A vibration-dampening anchorage for restraining upward motion of a beam, comprising means for transferring the upward reaction of the beam to an anchorage through two separate laminations of resilient material, said laminations being confined between the web and flanges of a structural metal beam and an outer rigid member having the form of an inverted U-shaped socket engaging a foundation, said socket being provided with flanges engaging the resilient laminations in such manner as to restrain their upward motion.

8. A vibration-dampening support for a load-carrying beam consisting of a unitary assemblage comprising means for supporting the beam on two separate laminations of resilient material confined between rigid elements engaging the beam and a foundation respectively, the inner rigid element consisting of a U-shaped flanged stirrup engaging the beam, and the outer rigid element consisting of a U-shaped flanged stirrup engaging the foundation, these inner and outer rigid elements engaging the resilient laminations in such manner that the line of application of the vertical load is displaced laterally with respect to the line of application of the reaction of the foundation, and also so disposed that the resilient laminations restrain motion of the beam in a direction transverse to the axis of the beam.

9. A vibration-dampening support for a load-carrying beam consisting of a unitary assemblage comprising means for supporting the beam on two separate laminations of resilient material, said resilient laminations being confined between the web and flanges of a structural metal beam, and an outer rigid element consisting of a flanged socket engaging a foundation, the beam and socket engaging the resilient laminations in such manner that the line of application of the vertical load is displaced laterally with respect to the line of application of the reaction of the foundation, and also so disposed that the resilient laminations restrain motion of the beam in a direction transverse to the axis of the beam.

STEPHEN E. SLOCUM.